(12) United States Patent
Turner et al.

(10) Patent No.: US 8,640,718 B2
(45) Date of Patent: *Feb. 4, 2014

(54) VEHICLE SPRAY WASHER WITH LIGHTED SPRAY ARM

(75) Inventors: Barry S. Turner, Novi, MI (US); Thomas E. Weyandt, Northville, MI (US); Jerry Alan Kotrych, Livonia, MI (US)

(73) Assignee: Belanger, Inc., Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,054

(22) Filed: Aug. 27, 2012

(65) Prior Publication Data

US 2012/0318310 A1 Dec. 20, 2012

Related U.S. Application Data

(62) Division of application No. 12/707,777, filed on Feb. 18, 2010.

(51) Int. Cl.
*B08B 3/02* (2006.01)

(52) U.S. Cl.
USPC ............ 134/113; 134/123; 134/198; 134/199

(58) Field of Classification Search
None
See application file for complete search history.

(56) References Cited

U.S. PATENT DOCUMENTS

| 5,786,758 | A * | 7/1998 | Bullock ................... 340/539.32 |
| 7,438,075 | B1 * | 10/2008 | Huntington et al. ........ 134/57 R |
| 2005/0279385 | A1 * | 12/2005 | Grier et al. ....................... 134/18 |
| 2006/0157093 | A1 * | 7/2006 | Belanger ........................ 134/123 |
| 2007/0034235 | A1 * | 2/2007 | Weyandt et al. ................. 134/18 |

* cited by examiner

*Primary Examiner* — Michael Kornakov
*Assistant Examiner* — Ryan Coleman
(74) *Attorney, Agent, or Firm* — Young Basile Hanlon & MacFarlane PC

(57) ABSTRACT

A spray-type car wash system includes an overhead carriage which can move longitudinally the length of a wash bay. A pair of laterally opposed spray arms depend from the carriage. During vehicle entry into the bay, LED-based lights running down the length of each arm are caused to flash to help the driver center a vehicle between the arms. Cushioning and breakaway features protect the arms from damage. A single-arm system is also disclosed. A double-light, stationary support system is also disclosed.

21 Claims, 3 Drawing Sheets

(12)	United States Patent
	US 8,640,718 B2

VEHICLE SPRAY WASHER WITH LIGHTED SPRAY ARM

CROSS REFERENCE TO RELATED APPLICATION

This application is a divisional of the co-pending U.S. patent application Ser. No. 12/707,777 filed Feb. 18, 2010 and is incorporated herein.

FIELD OF THE INVENTION

This invention relates to spray-type devices for washing vehicles in a bay and more particularly to the lighting system that provides assistance in positioning a vehicle within the bay.

BACKGROUND OF THE INVENTION

It is known to wash a vehicle parked in a bay by means of spray arms which travel around the vehicle while dispensing various chemicals in streams of water. Reissue U.S. Pat. No. 40,463 dated Aug. 26, 2008 and assigned to Belanger, Inc. of Northville, Mich. describes such a system. Two reversely similar arms which depend from an overhead carriage are supplied with water and chemicals for washing and rinsing and are caused to move around the vehicle to wash the entire outside surface thereof.

The system described in the Reissue patent is reasonably tolerant of positioning errors which result in an off-center vehicle; i.e., the system described in the Reissue patent has the capability of lateral as well as longitudinal translation and can, therefore, adjust its travel to the actual centerline of the vehicle rather than simply following the center line of the bay.

Where that lateral adjustment capability is not present, proper positioning of the vehicle becomes more important. Various mechanisms including dangling objects and laser beams which contact the windshields of the vehicle are known as assists to the driver of a vehicle entering, for example, a residential garage. These devices are not always suitable for use in a spray-type car wash for various reasons including the fact that they draw the driver's attention to themselves, often causing disregard for other equally important positioning cues.

SUMMARY OF THE INVENTION

The present invention provides visual positioning assistance to a driver entering a wash bay to help the driver position the vehicle substantially centrally in the bay. In general, the apparatus aspect of the invention comprises the combination of a wash system having a lighting system to provide a visual cue for entering the bay.

In one embodiment, the wash system uses twin, laterally spaced-apart spray arms and the lighting elements are elongate LED-filled tubes which are secured to and extend along the vertical portions of the mirror-image spray arms. The lights are a bright color, such as yellow, are arranged to face an incoming vehicle when the arms are in a "parted" position on opposite sides of the bay, and are flashed during the entry of the vehicle into the bay.

In another embodiment, vertical light strips are attached to stationary poles located on opposite sides of the bay. The light strips are illuminated when a car enters the bay.

In other embodiments, a single depending spray arm may be equipped with a light strip. This arm may be parked at or near the exit end of the bay or may be placed near the entrance to the bay and moved longitudinally toward the exit end as the car enters.

Another alternative is to use one movable arm with lights and another stationary arm with lights and locate them to provide a "goal post" effect.

As hereinafter described, the apparatus invention comprises additional features such as the use of foam cushioning around the spray arm or arms or light supports as well as a breakaway joint feature at the upper end of the vertical portion of each arm to prevent damage in the event of an inadvertent collision between a vehicle and a depending spray arm.

The method aspect of the invention comprises the steps of (a) positioning one or more spray arms in a strategic position relative to a bay, and (b) causing linear lights running down the arms on the sides facing the driver to illuminate and, preferably, to flash during the entry of the vehicle thereby to help a driver to center a vehicle in the bay while not distracting the driver from, for example, a sign which tells the driver to STOP when the vehicle has entered the bay far enough to be washed. These steps are normally carried out after an initializing step which simply involves sensing the approach of a vehicle and suitably arming the system.

As also hereinafter described in detail, during the wash and rinse phases, the arms of the twin arm wash system operate in a "butterfly" fashion to travel along and around the exterior of a vehicle parked in the bay. The arms depend pivotally from a carriage which is mounted on longitudinally extending overhead rails which run substantially along the length of the bay; i.e., on the order of 18 to 22 feet. Various means may be used to control the movement of the arms as hereinafter described in detail.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
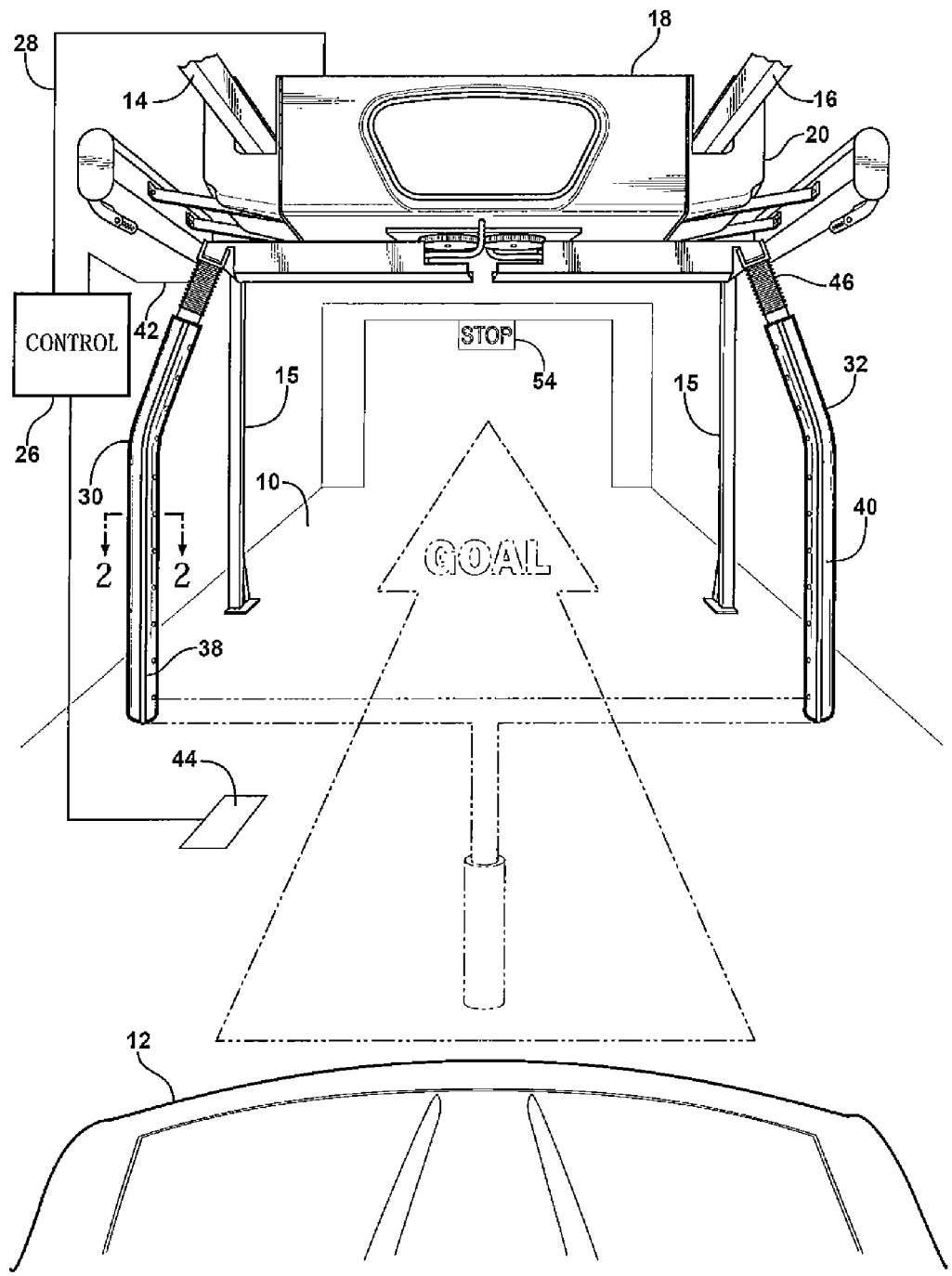
FIG. 1 is a perspective view of a wash bay employing the invention from the vantage point of a vehicle entering the bay.
Figure 2:
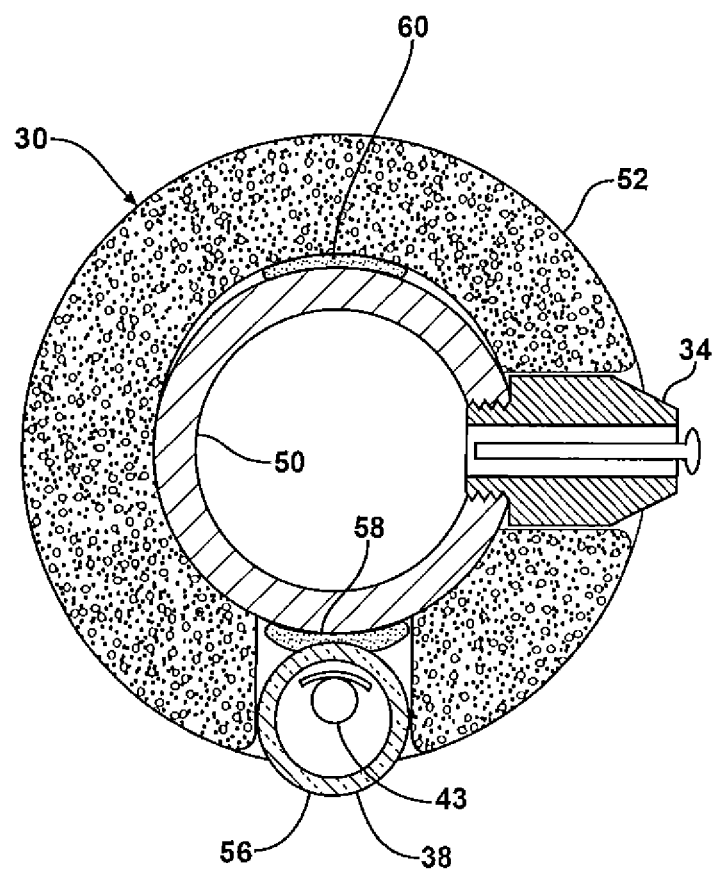
FIG. 2 is a cross-section through one of the spray arms in the system of FIG. 1.

Referring to the drawings, there is shown a wash bay 10 which is long and wide enough to receive a passenger vehicle 12 fully therein; typical dimensions may be on the order of 25 feet long by 10 to 15 feet wide. The wash bay may be partly or fully enclosed or, in warmer climates, may be essentially open.

Mounted overhead of the bay are longitudinally extending, parallel spaced-apart beams 14, 16 of rigid construction, usually aluminum or steel. Beams 14, 16 are held up by vertical posts 15 and/or wall brackets (not shown) so as to support the weight of a carriage 18 bearing appropriate and necessary pumps, valves, relays, motors and other equipment which will be apparent to persons skilled in the car wash arts. The carriage 18 includes a frame 20 having wheels (not shown) which sit on the beams 14, 16, respectively, so that the entire carriage and frame combination 18, 20 can be caused to move in a programmed fashion longitudinally over the wash bay 10 by the computer in a control center 26 which is connected to the carriage 18 by means of a data line 28. In this instance, the carriage 18 is fixed laterally of the frame 20.

Depending from the carriage and pivotally mounted thereto are essentially L-shaped spray arms 30, 32, each of which carries a water supply conduit as hereinafter described. Those conduits are equipped with inwardly-directed nozzles 34 for directing streams of chemical bearing water toward the vehicle 12 after it is suitably positioned and parked in the bay 10. The arms 30, 32 are on the order of 118 inches apart thereby to accommodate between them in non-contacting fashion most standard size passenger vehicles The arms are pivotally movable relative to the carriage 18 in a reversely similar "butterfly" fashion in conjunction with the longitudinal position of the carriage thereby to fully wrap around the vehicle 12 during a wash/rinse process. The nozzles 34 may be attached to the horizontal portions of the arms as well as the vertical portions thereby to wash the horizontal portions of the vehicle as well as all other exterior surface areas. The data line 28 running from the control 26 to the carriage 18 activates a motor (not shown) which drives the arms 30, 32 in mirror-image directions to perform the "butterfly" movements necessary to wash the entire vehicle 12.

When a vehicle approaches the bay 10, the control line 28 is also operable to move the arms 30, 32 to a "parked" position wherein the arms are directly laterally opposite one another so as to essentially frame the bay 10 for entry of the vehicle 12 therebetween. In the parked position, the longitudinal position of the arms 30, 32 may be essentially central of the bay 10 in the longitudinal direction. Switch 44 provides a signal to control 26 to park the arms 30, 32. The arms can also be parked at a forward position and then moved back toward the exit end as the vehicle enters.

In accordance with the invention, elongate tubular lights 38, 40 are attached to and extend along the vertical and substantially vertical portions of the arms 30, 32, respectively and can be operated in an intermittent flashing mode by means of data line 42 extending from the control 26 to the individual light devices.

The individual lights 38, 40 are made up of translucent yellow plastic tubes approximately ¾ inch in outside diameter and carrying within them serially connected high power yellow LEDs 43, preferably in the one-watt range. When illuminated and flashed as described above, the lights 38, 40 which face the driver of the entering vehicle provide a "goalpost" effect which facilitates maneuvering the vehicle into a position substantially centrally of the parked arms without diverting attention away from messages transmitted to the driver by means of a sign 54 which assists the driver in locating the vehicle longitudinally. The sign 54 as well as the flashing of the goalpost lights 38, 40 can be initiated by means of a floor mounted switch 44 at the entry end of the bay 10. The switch 44 is connected to the control 26 in conventional fashion. Yellow is believed to be a highly effective color, but other colors and/or combinations of colors, including white, can also be used.

The arms 30, 32 are reversely similar but are structurally essentially identical. Each arm comprises, as best shown in the cross-sectional view, a steel or cast iron pipe 50 approximately one inch in internal diameter. The pipe is connected through the horizontal portion of the arms to a supply line (not shown) to receive water and chemicals at appropriate pressure levels. A variable speed pump can be used to produce various pressures; i.e., higher pressure for wash and lower pressure for rinse.

Surrounding each conduit 50 is a thick sleeve 52 of extruded foam plastic such as polyethylene. The sleeve 52 acts as a protective cushion to prevent damage to either the conduit or a vehicle in the event of an inadvertent collision between the two. Light tubes 56 are held in gaps which are cut into the cushioning sleeve 52 and filled with a hot melt adhesive 58 to which the light tube is secured. A heater tape is placed between the inside surface of the sleeve 52 and the outside surface of the conduit 50 to prevent freezing when the system is operated in below-freezing temperatures.

Finally, the arms 30, 32 are preferably provided with breakaway mechanisms 46, 48 respectively to allow the arms to swing forward around horizontal axes of rotation in the event of a collision between the vehicle 12 and one of the arms. A suitable breakaway mechanism is fully described in the aforesaid Reissue U.S. Pat. No. 40,463, the full disclosure of which is incorporated herein by reference.

As an alternative embodiment, the wash system may have only one arm, such as 30, equipped to travel all around the vehicle. In this arrangement, the arm may be "parked" in the center of the bay (laterally) and at the exit end of the bay. The light tube runs down the arm between and around the nozzles to face the driver as he/she enters. Alternatively, one or more light tubes can run down the sides of the single arm and be angled to face the entering vehicle. A goal post effect can be achieved by adding a stationary light post laterally opposite the lighted movable arm.

Figure 3:
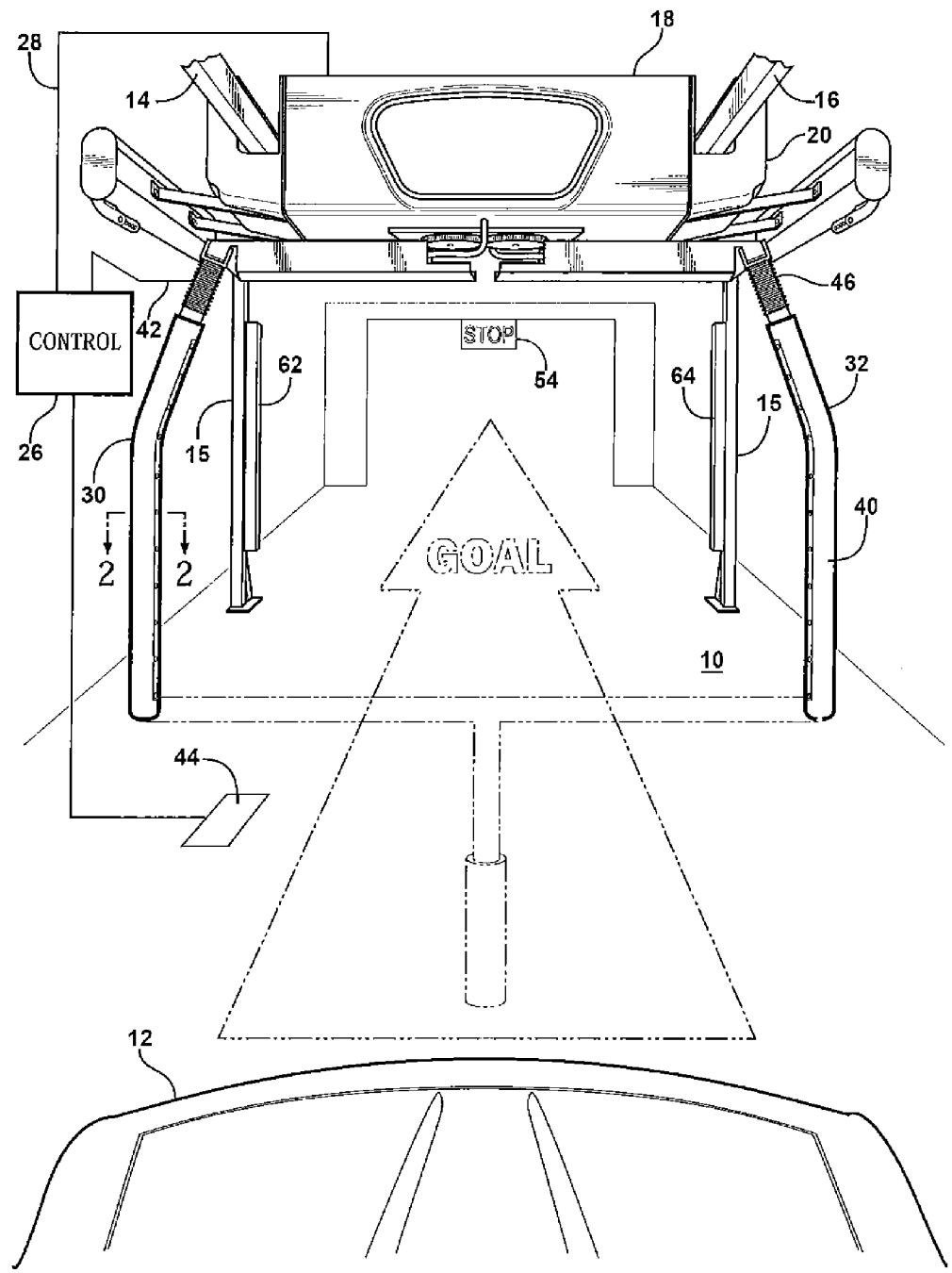
FIG. 3 is a perspective view of an entire system using stationary lights.

FIG. 3 shows another embodiment similar to FIG. 1 and using the same reference numbers for similar parts. In FIG. 3, the light strips 62, 64 are mounted on the sides of stationary poles 15 to provide the goal post effect. Obviously the lights 62, 64 must be far enough apart to allow the arms 30, 32 to pass them without interference.

The method of operating the device described above is essentially as follows:

1. A vehicle 12 approaches the wash bay 10 so as to engage the floor switch 44;
2. Assuming a twin arm system, the signal from the floor switch 44 acts through the controller 26 to cause the arms 30, 32 to be moved to the parked position; if a single arm system, the arm is moved to a center position unless a second stationary light post is provided in which case, the movable arm is parked laterally across from it.
3. The lights 38, 40 are illuminated by data line 42 and caused to flash producing bright yellow "goalpost" effect lighting which guides the driver to place the vehicle centrally between the goalpost arms 30, 32. The sign 54 illuminates to tell the driver of the vehicle 12 when to stop; and
4. The wash/rinse cycle then begins wherein the arms 30, 32 are caused to move around the vehicle multiple times to spray the vehicle with prewash, wash, and rinse fluids in accordance with conventional car wash practice.

After the vehicle departs the bay 10 the arm or arms 30, 32 are returned to the parked position.

It will be understood that the system may be equipped with a lateral movement capability as described in the aforementioned Reissue application or, as described herein, may operate without same so as to provide a capital cost savings to the operator and the system. Various other features including coin or token receivers, anti-spotting rinse systems, appropriate floor drains and other features may be provided as will be apparent to persons skilled in the art.

What is claimed is:

1. A wash system for vehicles in a wash location comprising:
   a rail system overhead of said location;
   a carriage mounted for movement along said rail system;
   a pair of spray arms depending downwardly from said carriage and into said wash location, wherein each arm comprises a breakaway mechanism between an upper portion of the arm and a lower portion of the arm, wherein each arm comprises vertically distributed nozzles for selectively directing washing fluids onto a vehicle in said location, and wherein the nozzles are arranged along a majority of the arm's longitudinal length that is beneath the breakaway mechanism;

means for moving said arms toward and apart from one another and around a vehicle in said location to wash said vehicle;

wherein each of said arms carries translucent tube along the arm that contains light sources and extends continuously along a majority of the arm's longitudinal length that is beneath the breakaway mechanism and wherein the translucent tube selectively and controllably provides columnar illumination along the length of the arm in such a way as to be visible to a driver of the vehicle while entering said location and being mounted on each arm in a location that does not obstruct the operation of said nozzles.

2. A wash system as defined in claim 1 wherein each of said arms comprises an elongate fluid conduit.

3. A wash system as defined in claim 2 wherein said translucent tube is plastic.

4. A wash system as defined in claim 1 further including a control system responsive to the entry of a vehicle to illuminate said arms and place the arms in a guidance position relative to a centerline of the location during a first time period and thereafter move the arms through a wash cycle during a second time period wherein the arms pass around the sides of a vehicle.

5. A wash system as defined in claim 4 wherein in said guidance position, the arms are adjacent one another and substantially in a center of said location.

6. A wash system as defined in claim 4 wherein in the guidance position, the arms are symmetrically spaced on opposite sides of said location.

7. A system as defined in claim 2 wherein the Light sources are LEDs.

8. A system as defined in claim 2 wherein the illumination is produced in a pattern calculated to convey information to the driver of a vehicle.

9. A spray type car washer for vehicles in a wash area comprising:
   a carriage system mounted for movement overhead of said arms;
   a pair of spray arms pivotally attached to and depending from said carriage vertically into said area; each said arm comprising a fluid conduit and carrying spray nozzles arranged in spaced-apart relationship along the length of the arm's fluid conduit for directing washing fluids onto a vehicle;
   each said arm further carrying a linearly distributed lighting system that, when activated, provides columnar illumination along the length of the arm;
   each arm further comprising an outer cushioning sleeve that encloses the arm's fluid conduit and partially encloses at least a portion of the arm's nozzles and at least a portion of the arm's lighting system;
   control means for activating said lighting systems and causing the arms to move around a vehicle to wash the vehicle.

10. A car washer as defined in claim 9 wherein the arms in said target position are symmetrically spaced apart in the manner of goal posts relative to a centerline of said area.

11. A car washer as defined in claim 9 wherein each of said arms includes an upper horizontal portion and a lower vertical portion, and a breakaway joint connected between the horizontal and vertical portions.

12. A car washer as defined in claim 9 wherein each said lighting system comprises an elongate translucent plastic member carrying spaced LEDs illuminating said member which acts to diffuse said illumination.

13. A spray-type washer for vehicles in a wash area comprising:
   a rail system extending longitudinally over the wash area;
   a carriage mounted on the rail system for longitudinal travel therealong;
   a pair of elongate spray arms pivotally and dependingly mounted from the carriage so as to extend substantially vertically into the wash area for controlled travel around opposite sides of a vehicle in the area, wherein each spray arm comprises a breakaway mechanism between an upper portion of the arm and a lower portion of the arm, and wherein each spray arm comprises multiple spray nozzles arranged along a majority of the arm's longitudinal length that is beneath the breakaway mechanism;
   a vertically distributed lighting system carried by each of the arms capable of providing columnar illumination along the length of each of the arms, wherein the lighting system of each arm extends continuously along a majority of the arm's longitudinal length that is beneath the breakaway mechanism, and wherein the lighting system extends along a line that does not intersect a line along which the nozzles of that arm are arranged; and
   a control system for activating the lighting systems to illuminate the arms in response to a signal indicating the approach of a vehicle into the wash area and for further moving the arms around the vehicle to wash the vehicle after it has been positioned in the wash area.

14. A system as defined in claim 13 wherein each spray arm includes an elongate fluid conduit with plural nozzles and the lighting system on each arm includes a translucent plastic member extending substantially along the vertical length of the conduit and adjacent thereto, and a plurality of light sources linearly arranged within the plastic member.

15. A system as defined in claim 14 wherein the light sources are LEDs and the plastic member is tubular.

16. A system as defined in claim 13 wherein the illumination is of a color other than white.

17. A system as defined in claim 13 wherein each of the arms comprises an upper horizontal structural portion pivotally connected to said carriage and a generally vertical conduit portion interconnected to said horizontal portion.

18. A spray-type car wash system comprising:
   a pair of spray arms, each with multiple spray nozzles arranged vertically therealong, wherein the nozzles of each spray arm extend along a fluid conduit that extends along the length of the spray arm, and wherein each arm comprises a breakaway mechanism between an upper portion of the spray arm and a lower portion of the spray arm;
   a carriage for moving the spray arms in a laterally symmetrical pattern around a vehicle in a wash area to direct washing fluids toward same; and
   each of said arms carrying a vertically distributed lighting system to create a substantially linear pattern of illumination extending along substantially the entire vertical length of the arm, wherein the lighting system of each arm extends along the majority of the arm's longitudinal length that is beneath the breakaway mechanism, and wherein each arm further comprising an outer cushioning sleeve that encloses the arm's fluid conduit and partially encloses at least a portion of the arm's nozzles and at least a portion of the arm's lighting system.

19. A spray-type car wash system as defined in claim 18 wherein the lighting system on each arm comprises a translucent plastic tube extending along the arm and a series of light sources within the tube to create illumination.

20. A spray-type car wash system as defined in claim 18 further comprising a control for producing a signal indicating imminent entry of a vehicle into the wash area to activate the lighting systems on the arm during the entry of a vehicle into the wash area.

21. A spray-type washer as defined in claim 13 further comprising a stop sign separate from said arms so as to be visible to a vehicle driver entering said area.

\* \* \* \* \*